US012615249B2

(12) United States Patent
Cheng et al.

(10) Patent No.: US 12,615,249 B2
(45) Date of Patent: Apr. 28, 2026

(54) AES-GCM ENGINE OPTIMIZED FOR EXECUTE-IN-PLACE AUTHENTICATED DECRYPTION

(71) Applicant: Silicon Laboratories Inc., Austin, TX (US)

(72) Inventors: Heng Wee Cheng, Singapore (SG); Joshua Norem, Austin, TX (US); Steven Cooreman, Nittedal (NO); Phil Matthews, Driftwood, TX (US)

(73) Assignee: Silicon Laboratories Inc., Austin, TX (US)

( * ) Notice: Subject to any disclaimer, the term of this patent is extended or adjusted under 35 U.S.C. 154(b) by 461 days.

(21) Appl. No.: 18/074,744

(22) Filed: Dec. 5, 2022

(65) Prior Publication Data

US 2024/0187402 A1 Jun. 6, 2024

(51) Int. Cl.
*H04L 9/40* (2022.01)

(52) U.S. Cl.
CPC .................................. *H04L 63/083* (2013.01)

(58) Field of Classification Search
CPC ... H04L 63/083; H04L 9/0631; H04L 9/0637; H04L 9/3242; H04L 2209/80; H04W 12/03; H04W 12/06
See application file for complete search history.

(56) References Cited

U.S. PATENT DOCUMENTS

2008/0279368 A1* 11/2008 Yen ........................ H04L 9/0637
708/492
2022/0309190 A1* 9/2022 Gopal ................... H04L 9/0643

OTHER PUBLICATIONS

Silex Insight, AES-GCM Multi-Booster. 2023. <https://www.silexinsight.com/products/security/high-speed-aes/>.

* cited by examiner

*Primary Examiner* — Catherine Thiaw
*Assistant Examiner* — Nega Woldemariam
(74) *Attorney, Agent, or Firm* — Nields, Lemack & Frame, LLC

(57) ABSTRACT

A system and method for performing execute-in-place is disclosed, wherein the code is encrypted using AES-GCM and stored in an external memory device. The system includes only one cipher function that is used to encrypt the three counter values that are used to decrypted the encrypted code and to validate the Message Authentication Code (MAC). In some embodiments, the system precalculates a hash subkey so that generation of the Counter 0 value can begin as soon as a valid memory address is available. In addition, the cipher function is modified to utilized two or more cipher generation circuits and only one key expansion circuit. This improves the speed of the operation without a complete duplication of the cipher function hardware. In another embodiment, the cipher function is unrolled so that two or more rounds of key expansion and cipher generation are performed each clock cycle.

13 Claims, 17 Drawing Sheets

AES-GCM ENGINE OPTIMIZED FOR EXECUTE-IN-PLACE AUTHENTICATED DECRYPTION

FIELD

This disclosure describes systems and methods for authenticating AES encrypted data, and more specifically decrypting and authenticating code accessed in an external memory device to allow execute-in-place.

BACKGROUND

Many semiconductor devices include an AES engine to enable encryption and decryption operations. The AES engine performs a cipher function, which is a sequence of operations, referred to as a round, and repeats this sequence a plurality of times. The cipher function may be used to operate on a 16-byte block of data. Before the round-based encryption, a key expansion is performed to expand a single key into a different key for each round.

AES-GCM-256 (Advanced Encryption Standard-Galois/Counter Mode) is an AES mode which does not directly encrypt the data, but instead encrypts a counter value, and the encrypted counter value is XORed with the block of data to get the encrypted data. AESGCM-256 also generates a MAC (Message Authentication Code) value which can be used for authentication to ensure that the received ciphertext is unmodified. The suffix of 256 means that a 256-bit key is used.

In this disclosure, the term Nk refers to number of 32-bit words of the key, which for AES-GCM-256, Nk=8 words. Nb refers to number of 32-bit words that a block of data contains, which is Nb=4. Nr refers to the number of rounds that the AES encryption uses. For AES-GCM-256, Nr=14.

As noted above, AES-GCM-256 has two major components: key expansion and the cipher function.

Key expansion uses the Cipher Key (K) as an input and generates a key schedule. The Key Expansion generates a total of Nb (Nr+1) words: the algorithm requires an initial set of Nb words, and each of the Nr rounds requires Nb words of key data. The resulting key schedule consists of a linear array of 4-byte words, denoted [wi], with i in the range $0 \leq i < Nb$ (Nr+1). The expansion of the input key into the key schedule proceeds using several functions:

SubWord( ) is a function that takes a four-byte input word and applies the S-box to each of the four bytes to produce an output word.

RotWord( ) takes a word [a0, a1, a2, a3] as input, performs a cyclic permutation, and returns the word [a1, a2, a3, a0].

The specific implementation of the key expansion is well known and not described here.

The cipher function comprises a plurality of rounds: 10 rounds for AES-128, 12 rounds for AES-192 and 14 rounds for AES-256. In each round, a sequence of operations is performed. Each operation may be performed by a circuit, the descriptions of which are provided below. Thus, the terms "circuit", "operation" and "function" may be used interchangeably throughput this disclosure. The input data, which may be 16 bytes arranged in a 4×4 array, undergoes the following operations:

SubBytes( ) replaces each byte of the input with a different byte, determined by a lookup table ShiftRows( ) shifts the 4×4 array. For example, the first row of the 4×4 array is left intact, while the second row is shifted cyclically one place to the left. The third row is shifted cyclically two places to the left. The fourth row is shifted cyclically three places to the left.

MixColumns( ) performs matrix multiplication of each column of the incoming array. Specifically, the MixColumns function performs the following operation:

$$\begin{bmatrix} \text{Output}(0, j) \\ \text{Output}(1, j) \\ \text{Output}(2, j) \\ \text{Output}(3, j) \end{bmatrix} = \begin{bmatrix} 2 & 3 & 1 & 1 \\ 1 & 2 & 3 & 1 \\ 1 & 1 & 2 & 3 \\ 3 & 1 & 1 & 2 \end{bmatrix} \begin{bmatrix} \text{Input}(0, j) \\ \text{Input}(1, j) \\ \text{Input}(2, j) \\ \text{Input}(3, j) \end{bmatrix} \text{ for } 0 \leq j \leq 3$$

Thus, the MixColumns operation performs a matrix multiplication on each column of the array.

Add RoundKey( ) exclusive or's (XORs) each byte from the MixColumns operation with a byte of the round key.

As noted above, AES-GCM-256 does not directly encrypt the data, but instead encrypts a counter value, and the encrypted counter value is XORed with the block of data to generate the encrypted data. FIGS. 1A-1B shows a circuit that may be used to perform the AES encryption/decryption.

AES-GCM uses AES block cipher operation and the GHash hashing function for authenticated encryption. FIGS. 1A and 1B show AES-GCM encryption/decryption operation, respectively, with 2 blocks of data.

Cipher function (EK) 10 denotes the block cipher encryption using the key K, GHASH function 11 denotes multiplication in GF ($2^{128}$) by the hash subkey H, and increment 12 denotes the counter increment function. The circled plus sign represents the XOR operation 16. Each of these functions represents a circuit used to perform the stated function. Block 17 represents a constant, which is the concatenation of the length of the authenticated data (which is 0) and the length of the ciphertext.

As seen in FIG. 1A, for encryption, Counter 0 is incremented to create Counter 1 and Counter 2. Counter 1 and Counter 2 are each encrypted using the Cipher function 10 and XORed using XOR operation 16 with plaintext 20, 21, respectively, to generate the encrypted data 30,31. An authentication tag 40 (which is then stored as the MAC; message authentication code) is also generated. Specifically, the GHASH function 11 is performed on the first encrypted data 30. That interim result is XORed with the second encrypted data 31 to generate a second interim result. The GHASH function 11 is then performed on the second interim result to generate a third interim result. That third interim result is then XORed with a constant (see Block 17) to generate a fourth interim result. The GHASH function 11 is then performed on the fourth interim result to generate a fifth interim result. The fifth interim result is then XORed with the encrypted Counter 0 value to generate the authentication tag 40.

As shown in FIG. 1B, for authentication, the Counter 0 is incremented to generate the Counter 1 value and the Counter 2 value. Each of these three counter values is then encrypted using cipher function 10 to generate encrypted counter values. The ciphertext (i.e., the encrypted data from memory) is then XORed with a respective encrypted counter value (either Counter 1 or Counter 2) to generate the plaintext data 20, 21. The ciphertext also goes through several GHASH functions 11 and XOR operations 16, as described above, before finally being XORed with encrypted Counter 0 value. This results in an authentication tag 40, which is then compared to the MAC received from the external memory to authenticate the data.

FIG. 2 shows one embodiment of the cipher function (EK) 10. In this embodiment, the cipher function 10 has two portions; a cipher generation circuit 101 and a key expansion circuit 141. The cipher generation circuit 101 is iterated across multiple clock cycles to get the final encrypted output, and the key expansion circuit 141 is also iterated across multiple clock cycles.

First, the counter value, which may be Counter 0, Counter 1 or Counter 2, is added to the initial key using AddRK 100 and stored in a Register Bank 110. At the same time, the initial key is stored in a key register bank 140. The cipher function is then iterated for one round using the cipher round circuit 120. The cipher round circuit 120 performs the SubBytes( ) ShiftRow( ), MixCol( ) and AddRoundKey( ) functions described above. At the same time, the key expansion also undergoes one expansion using key round circuit 150. Note that the output of the key round circuit 150 is also an input to the cipher round circuit 120. Finally, the new value of the cipher function is stored in register bank 130 and the new value of the key expansion is stored in register bank 160. After all the rounds are completed, the encrypted counter value appears at the output of the register back 130. Note that this circuit may be implemented differently. For example, the register banks 110 and 130 may be combined into a single bank. Additionally, the register bank 140 and 160 may be combined into a single bank. Thus, the cipher generation circuit 101 performs the operations necessary to execute the AES-GCM algorithm. To minimize the amount of circuitry, the cipher generation circuit 101 comprises combinational logic to execute a single round and uses this combinational logic 14 times (for AES-GCM-256). Likewise, the key expansion circuit 141 performs the operations necessary to execute the key expansion for the AES-GCM algorithm. To minimize the amount of circuitry, the key expansion circuit 141 comprises combinational logic to execute a single round and uses this combinational logic 14 times (for AES-GCM-256).

FIG. 3 shows a representative timing diagram showing the operation of the cipher function 10. Note that each clock, another cipher round (CRx) is performed. Concurrently, another key expansion (RKx) is also performed. Thus, in this embodiment, the performance of the cipher function 10 consumes 16 clock cycles.

Although not shown, the GHASH function 11 may consume 8 clock cycles. In other embodiments, the GHASH function 11 may be designed to consume 1, 2 or 4 clock cycles. The choice of design is based on a tradeoff between circuit area and speed.

As described above, in some embodiments, the data in a memory device may be encrypted prior to be saved. FIG. 4 shows a traditional timing diagram for a Quad SPI (Serial Peripheral Interface) DDR (double data rate) port. Since the data path is 4 bit wide, a byte may be transferred in 1 clock cycle, since data is transferred on both edges of the clock signal. The SPI read transaction involves a command, which is 1 byte in length, an address, which may be 3 bytes in length, and some dummy cycles, which may be 3 clock cycles. After the dummy cycles, the memory device begins supplying read data. Note that 16 clock cycles are required to produce 4 doublewords (i.e. 16 bytes) of read data. Thus, for 32 bytes of data and an 8 byte MAC, a total of 40 clock cycles are needed to output all of the read data.

FIG. 5 shows the AES engine shown in FIG. 1B along with the timing diagram of the Quad SPI shown in FIG. 4. Note that in this embodiment, 2 blocks of data (i.e. 32 bytes)

are encrypted and decrypted as a group. In traditional systems, the AES engine includes a single cipher function and a single multiplier (GHASH) to minimize the number of transistors and the size of the AES engine. Therefore, these circuits are used in a serial fashion. In other words, FIG. 5 shows 4 separate cipher functions 10. These four cipher functions are executed serially, therefore requiring a minimum of 64 clock cycles (4×16 clock cycles). Also, note that in this figure, the AES engine does not begin operating until the encrypted data is received from the Quad SPI interface. As explained above, the cipher function 10 may consume 16 clock cycles and the GHASH function may consume 8 clock cycles or less.

A constant value, referred to as $0^{128}$, is encrypted using the cipher function 10 to generate Hash Subkey 14. Hash Subkey 14 is then multiplied by the initialization vector 15 using the GHASH function 11, which may consume 8 clock cycles. The initialization vector 15 is typically a unique value that may be created by combining a secret value that is unique to the semiconductor device and the address of the data block. This generates counter 0. Counter 0 is then incremented to generate Counter 1 and Counter 2 using increment function 12. These counter values are each subjected to the cipher function 10. As noted above, since there is one circuit that performs the cipher function 10, these counter values are encrypted sequentially. The outputs of those cipher functions 10 are then respectively added to the encrypted data 30, 31 read from the memory device using XOR 16 to produce the plaintext data 20, 21. Note that the first plaintext data 20 is generated 40 clock cycles after the AES engine started. The second plaintext data 21 is generated 16 clock cycles later. Finally, another 16 clock cycles are needed to generate the authentication tag 40, which is compared to the MAC stored in the memory device.

Thus, this configuration is unacceptable for execute-in-place implementations, as the plaintext code is not available and authenticated until 72 clock cycles after the first 16 encrypted bytes are available. Stated differently, the plaintext data is available 96 clock cycles after the start of the read operation, even though the encrypted data and MAC are available 48 clock cycles after the start of the read operation. Execute-in-place denotes that the code is stored in an external memory device and code is read directly from the memory device by the processing unit.

Therefore, it would be advantageous if there were a system and method that could decrypt and authenticate encrypted data from a memory device sufficiently fast such that the system may utilize execute-in-place.

SUMMARY

A system and method for performing execute-in-place is disclosed, wherein the code is encrypted using AES-GCM and stored in an external memory device. The system includes only one cipher function that is used to encrypt the three counter values that are used to decrypted the encrypted code and to validate the Message Authentication Code (MAC). In some embodiments, the system precalculates a hash subkey so that generation of the Counter 0 value can begin as soon as a valid memory address is available. In addition, the cipher function is modified to utilized two or more cipher generation circuits and only one key expansion circuit. This improves the speed of the operation without a complete duplication of the cipher function hardware. In another embodiment, the cipher function is unrolled so that two or more rounds of key expansion and cipher generation are performed each clock cycle.

According to one embodiment, a wireless network device is disclosed. The wireless network device comprises a network interface; a processing unit; an AES engine, utilizing AES-GCM, adapted to interface with an external memory device, utilizing a SPI interface; wherein the AES engine is configured to: receive encrypted code from the external memory device as eight doublewords and a Message authentication code (MAC) having two doublewords; and decrypt the eight doublewords and authenticate the MAC within eight clock cycles after receiving the MAC, so as to allow execute-in-place. In some embodiments, the SPI interface comprises a Quad DDR SPI. In some embodiments, the SPI interface comprises an Octal DDR SPI. In some embodiments, the AES engine comprises exactly one cipher function and exactly one GHASH function, wherein an encrypted Hash subkey value is precalculated and stored in a register and is used during each transaction, in combination with a memory address, to generate a value for Counter 0. In certain embodiments, generation of the value of Counter 0 using the exactly one GHASH function begins as soon as the memory address is valid. In some embodiments, the exactly one GHASH function consumes 8 clock cycles or less, such that the value of Counter 0 is available within 8 clock cycles after the memory address is valid. In some embodiments, the AES engine comprises exactly one cipher function and exactly one GHASH function, wherein the exactly one cipher function comprises exactly one key expansion circuit and two or more cipher generation circuits, each receiving inputs from the exactly one key expansion circuit. In some embodiments, the AES engine comprises exactly one unrolled cipher function and exactly one GHASH function, wherein the exactly one unrolled cipher function comprises exactly one key expansion circuit and exactly one unrolled cipher generation circuit, where two rounds of key expansion and cipher generation are performed during each clock cycle. In some embodiments, the AES engine comprises exactly one key expansion circuit and wherein encryption of three counter values is performed by a time when the MAC is available from the external memory device.

According to another embodiment, an AES-GCM-256 engine for generated plaintext data and for authenticating a message authentication code is disclosed. The AEZ-GCM-256 engine comprises a GHASH function; and a cipher function comprising: exactly one key expansion circuit; and one or more cipher generation circuits; wherein encryption of three counter values is performed within 32 clock cycles. In some embodiments, the cipher function comprises two cipher generation circuits, each in communication with the exactly one key expansion circuit, so that encryption of two of the three counter values is performed simultaneously. In some embodiments, the cipher function comprises three cipher generation circuits, each in communication with the exactly one key expansion circuit, so that encryption of the three counter values is performed simultaneously. In some embodiments, the cipher function comprises exactly one cipher generation circuit wherein the exactly one key expansion circuit and the exactly one cipher generation circuit are unrolled such that two or more rounds of key expansion and cipher generation are performed during each clock cycle. In some embodiments, the cipher function comprises a plurality of cipher generation circuits wherein the key expansion circuit and the plurality of cipher generation circuits are unrolled such that two or more rounds of key expansion and cipher generation are performed during each clock cycle.

According to another embodiment, a method of decrypting encrypted data and authenticating a message authentication code (MAC) read from an external memory device, wherein the encrypted data comprises 8 doublewords and the MAC comprises 2 doublewords is disclosed. The method comprises calculating a hash subkey prior to reading the encrypted data from the external memory device; using a GHASH function to generate a Counter 0 value using the hash subkey, wherein the GHASH function begins execution when a valid memory address is available; incrementing the Counter 0 value to generate a Counter 1 value and a Counter 2 value; using exactly one cipher function to encrypt the Counter 0 value, the Counter 1 value and the Counter 2 value to generate an encrypted Counter 0 value, an encrypted Counter 1 value and an encrypted Counter 2 value; decrypted the encrypted data by XORing the encrypted Counter 1 value and the encrypted Counter 2 value with the encrypted data to obtain plaintext data; performing the GHASH function on the encrypted data and the encrypted Counter 0 value to generate an authentication tag; and comparing the authentication tag with the MAC to authenticate the MAC. In some embodiments, the exactly one cipher function comprises exactly one key expansion circuit and two cipher generation circuits, each in communication with the exactly one key expansion circuit, such that two encrypted counter values are generated simultaneously and encryption of a third counter value is performed sequentially. In some embodiments, the exactly one cipher function comprises exactly one key expansion circuit and three cipher generation circuits, each in communication with the exactly one key expansion circuit, such that all three encrypted values counter are generated simultaneously. In some embodiments, the exactly one cipher function comprises exactly one unrolled key expansion circuit and exactly one unrolled cipher generation circuit in communication with the unrolled key expansion circuit, such that two or more rounds of key expansion and cipher generation are performed in one clock cycle, and wherein encryption of counter values is performed sequentially. In some embodiments, the exactly one cipher function comprises exactly one unrolled key expansion circuit and two or more unrolled cipher generation circuits in communication with the unrolled key expansion circuit, such that two or more rounds of key expansion and cipher generation are performed in one clock cycle, such that two or more encrypted counter values are generated simultaneously. In some embodiments, encryption of the Counter 0 value, the Counter 1 value and the Counter 2 value is performed within 32 clock cycles.

BRIEF DESCRIPTION OF THE DRAWINGS

For a better understanding of the present disclosure, reference is made to the accompanying drawings, in which like elements are referenced with like numerals, and in which.

DETAILED DESCRIPTION

As described above, execute-in-place allows a processing unit to fetch instructions directly from an external memory device rather than using an internal cache. However, data stored in an external memory device is often encrypted. The decryption and authentication of this data may be a time consuming process making execute-in-place unattractive or even impossible.

Consequently, the present disclosure describes a modified AES engine that is suitable for execute-in-place configurations.

Figure 6:
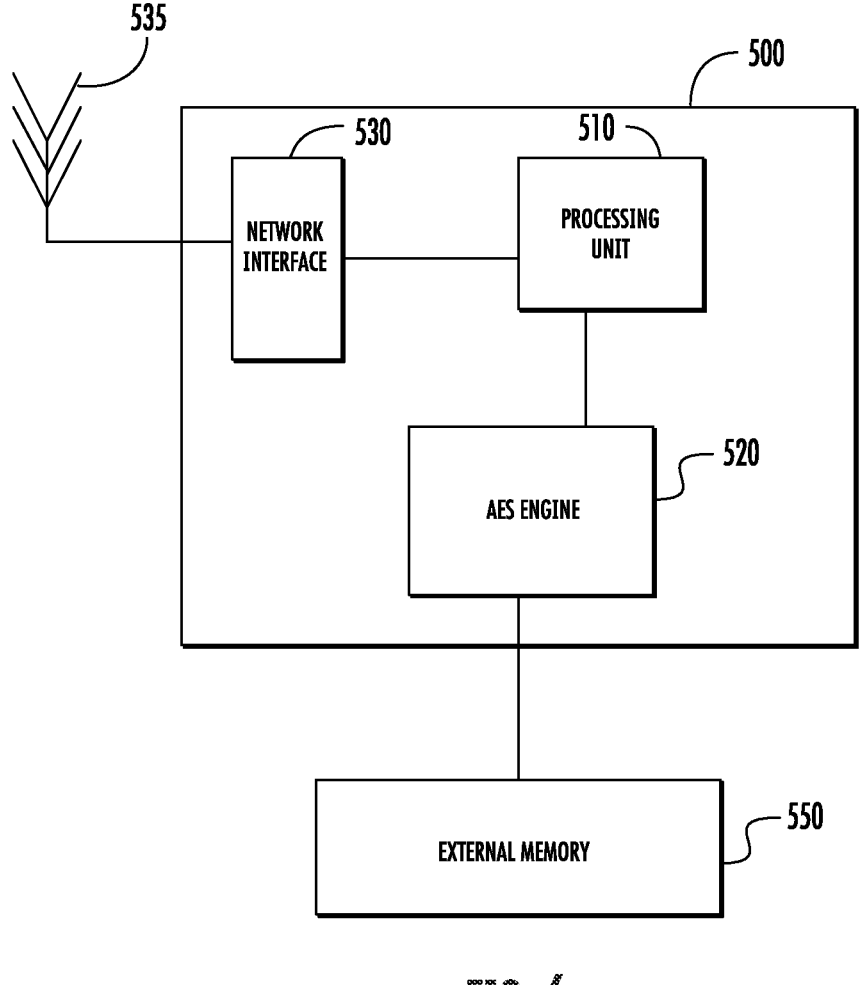
FIG. 6 shows a network device that utilizes the AES engine described herein.

FIG. 6 shows a network device that utilizes the modified AES engine. The network device comprises an integrated circuit, such as a System on a chip (SoC). This SoC 500 includes a processing unit 510. The processing unit 510 may be any suitable component, such as a microprocessor, embedded processor, an application specific circuit, a programmable circuit, a microcontroller, or another similar device. The SoC 500 also includes a network interface 530, which may be a wireless interface that connects with an antenna 535. The network interface 530 includes a receive circuit and a transmit circuit. The receive circuit may include a low noise amplifier (LNA), a mixer, a local oscillator, a programmable gain amplifier (PGA), an analog to digital converter (ADC), and a channel filter. The transmit circuit may include a power amplifier and a mixer.

The SoC 500 may also include an AES engine 520. This AES engine 520 may include any of the embodiments described herein. The AES engine 520 is used to encrypt and decrypted data to and from the external memory device 550.

In some embodiments, the external memory device 550 may be a non-volatile memory, such as a FLASH ROM, an electrically erasable ROM or other suitable devices. In other embodiments, the external memory device 550 may be a volatile memory, such as a RAM or DRAM. In some embodiments, the external memory device 550 interfaces with the SoC 500 using a SPI interface. This may be a 4 bit wide interface (Quad SPI) or an 8 bit interface (octal SPI). The SPI interface may a double data rate (DDR) interface, such as Quad DDR SPI or Octal DDR SPI.

The AES engine 520 is designed to support execute-in-place. In this disclosure, this is defined as the ability to generate the plaintext for two blocks of data and verify the authenticity of that data within eight clocks after when the MAC was read from the external memory device 550.

Figure 5:
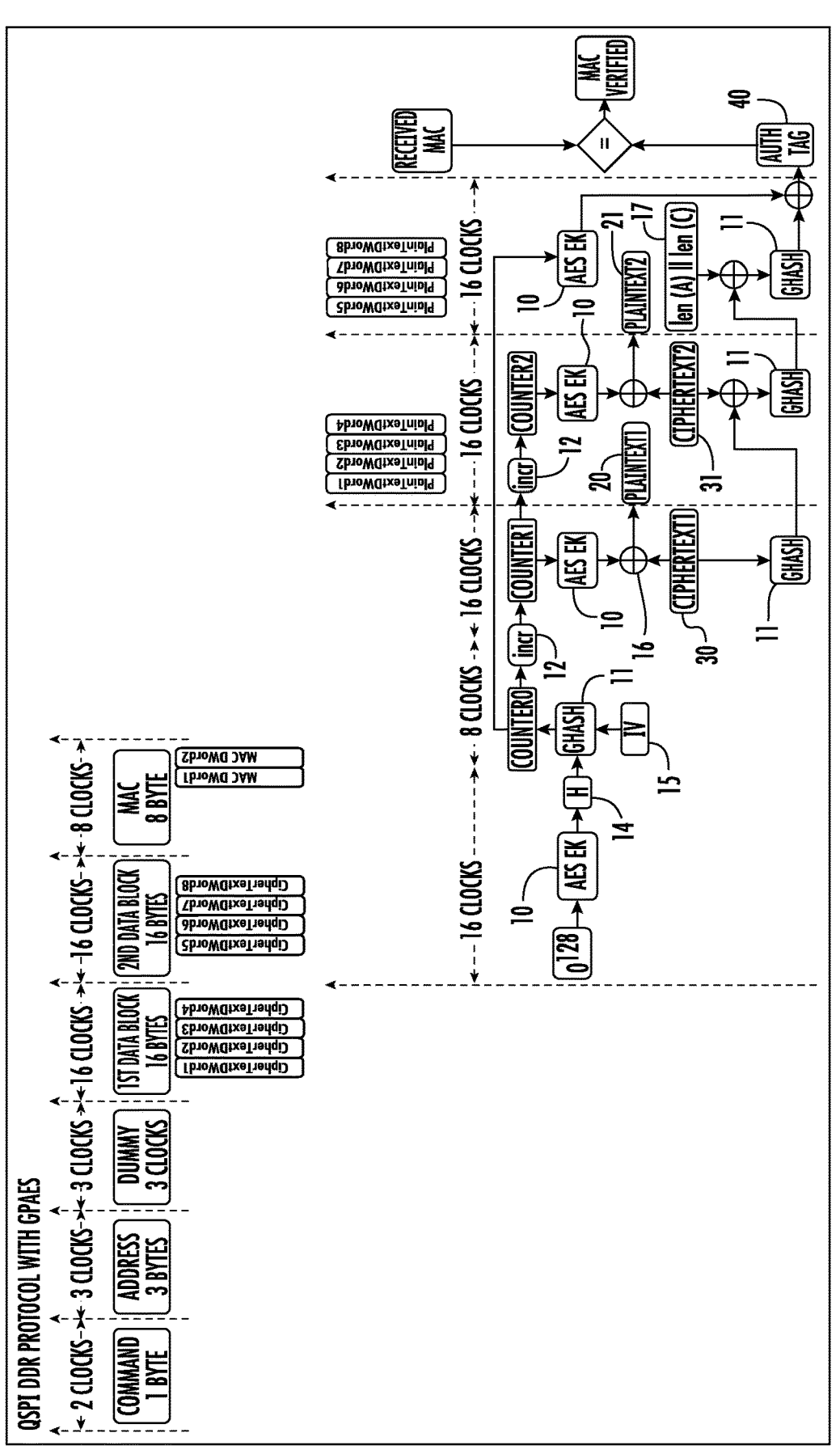
FIG. 5 shows the AES engine shown in FIG. 1B along with a timing diagram of Quad SPI.

All of the modifications described herein are modifications of the AES engine shown in FIG. 5.

According to a first embodiment, some of the calculations associated with decryption are performed at initialization and stored in a register. Specifically, for AES-GCM, encryption is done on the counter value and not the encrypted data. Therefore, there is no need to wait until the encrypted data is available to start encryption.

As $0^{128}$ is a constant value comprising 128 zeros, and does not change, the encrypted value of $0^{128}$, referred to as Hash subkey 14, may be precalculated and stored in a 128 bit register. This stored value is then used for all SPI transactions.

Once the new memory address is received by the AES engine 520, decryption can begin. The memory address, in conjunction with other values, such as a unique value associated with the specific SoC, is used to compute the initial vector (IV) 15. In some embodiments, a signal, such as an enable signal or a start signal, may be used to indicate that a valid memory address is present. Once the IV 15 is calculated, the GHASH function 11 may be performed to calculate Counter 0. The rest of the AES engine 520 is the same as that described with respect to FIG. 5. However, because Hash subkey 14 has been precalculated and the decryption begins as soon as the memory address is available, the encrypted value of Counter 1 is available when the first block of data is read from the external memory device 550. Thus, the plaintext data 20 is available immediately after the encrypted data 30 is read.

The cipher function 10 is then used to encrypt Counter 2 while the second block of data is being read from the external memory device 550. The cipher function 10 takes the same number of clock cycles as the reading of a block of data. Thus, the second block of plaintext data 21 is available immediately after the second block of encrypted data 31 is read. Note that a GHASH function 11 may also be performed during this time. However, since this consumes less clock cycles that the cipher function 10, it does not affect the generation of the plaintext data 21.

Finally, the cipher function 10 is then used to encrypt Counter 0 so that the authentication tag 40 can be generated. The authentication tag 40 is then compared to the MAC so that the MAC can be verified. Note that this operation consumes 16 clocks, while reading the MAC from the external memory device 550 only takes 8 clock cycles. Therefore, there is a penalty of about 8 clock cycles associated with this approach.

In summary, exactly one cipher function 10 is used, wherein it is used three times in series to perform the encryption of the three counter values. The encryption of Counter 1 is complete by the time that the encrypted data 30 is read from the external memory device 550. The encryption of Counter 2 is complete by the time that second block of encrypted data 31 is read from the external memory device 550. Further, exactly one GHASH function 11 which is used 4 times (once to create the Counter 0 value and three times to generate the authentication tag 40). Thus, in this embodiment, Hash subkey 14 is precalculated and stored. Additionally, the encryption that results in the value of Counter 0 is started as soon as a valid address is available. These two modifications allow the plaintext data to be available and authenticated 56 clock cycles after the read operation begins. This is an improvement of 40 clock cycles over the embodiment shown in FIG. 5. Note that this result may be further improved if the GHASH function is performed in less than 8 clock cycles. In other words, if the GHASH function consumes 4 clock cycles, the first use of the cipher function 10 may begin 4 clock cycles sooner, which also allows the second and third use of the cipher function to begin sooner. Thus, by using a faster GHASH function 11 (such as 1 clock cycles), the plaintext data may be available and authenticated only 49 clock cycles after the read operation begins.

This improvement may be used alone or in conjunction with any of the following modifications.

Figure 7:
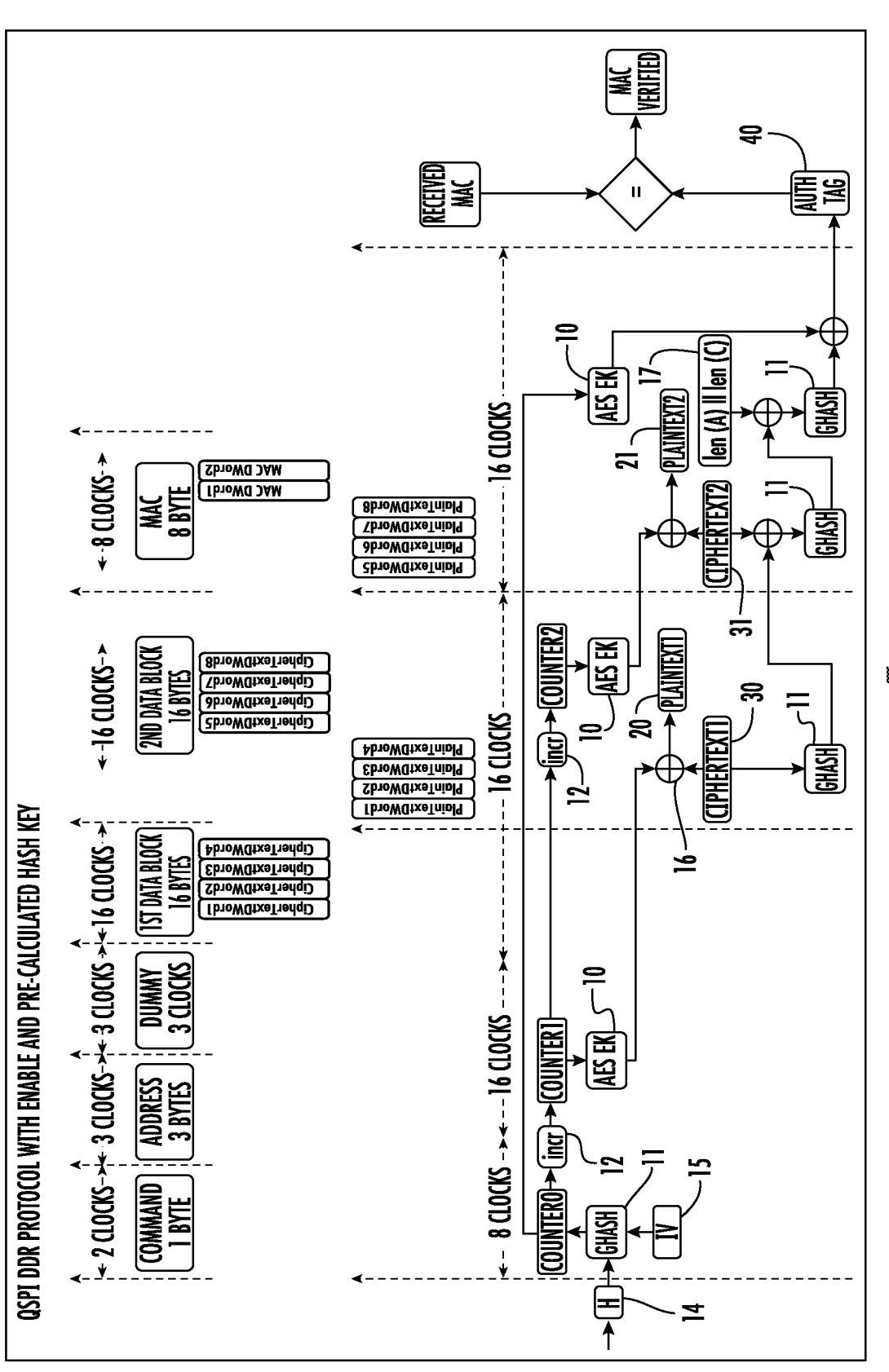
FIG. 7 shows a first modification of the AES engine to improve latency.

By reviewing FIG. 7, it can be seen that the cipher function 10 is the limiting factor in generating and authenticating the plaintext. Thus, in another embodiment, the cipher function 10 may be modified such that two or more ciphers may be performed simultaneously. This may be achieved by duplicating or triplicating the circuitry needed for the cipher function 10. In this way, the encrypted values of two or more of the counters are calculated at the same time. In this way, the MAC may be authenticated as soon as the authentication tag 40 is available from the external memory device 550.

Figure 1A:
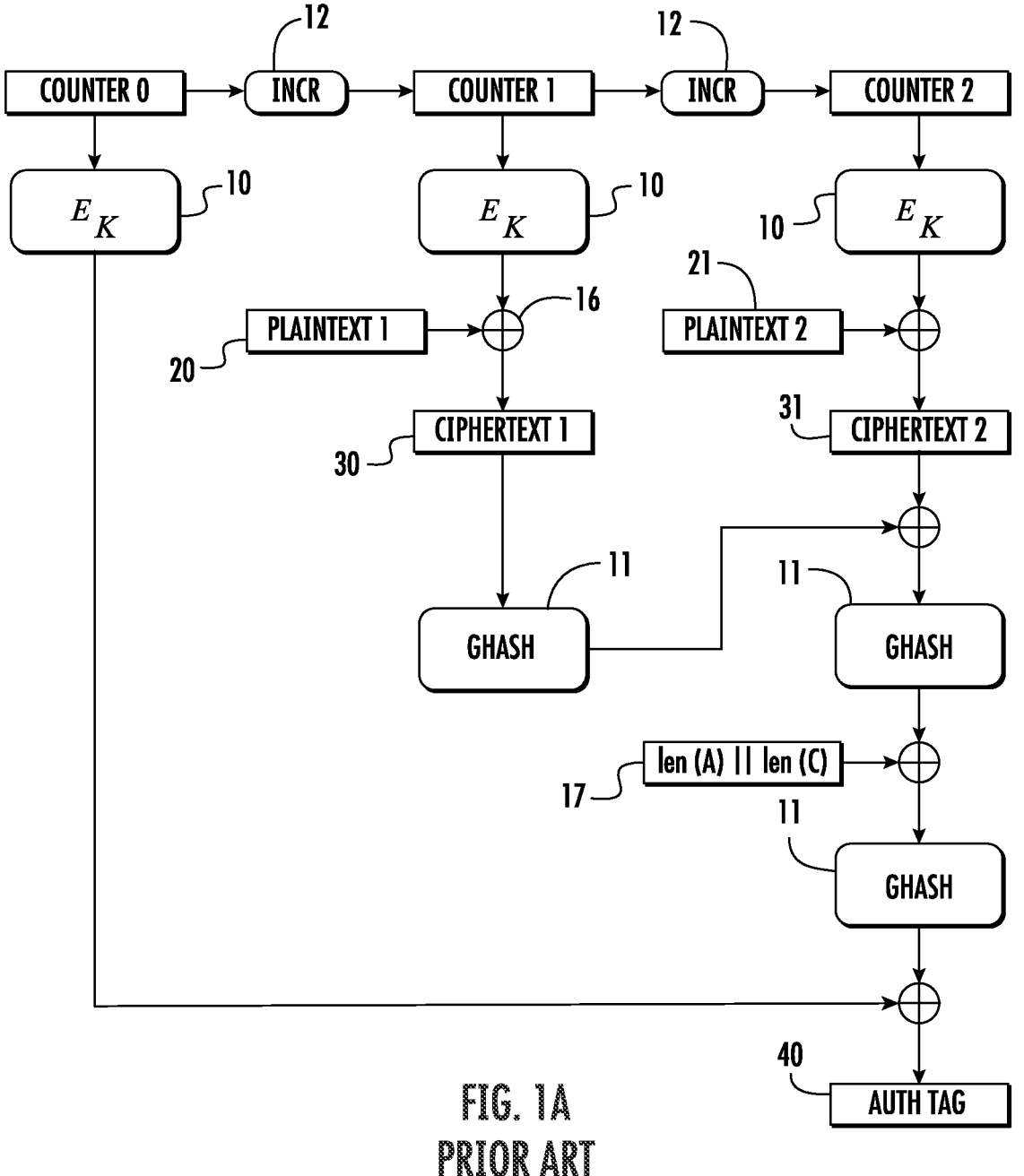
FIGS. 1A and 1B show AES-GCM encryption/decryption operation, respectively, with 2 blocks of data, according to one embodiment.
Figure 1B:
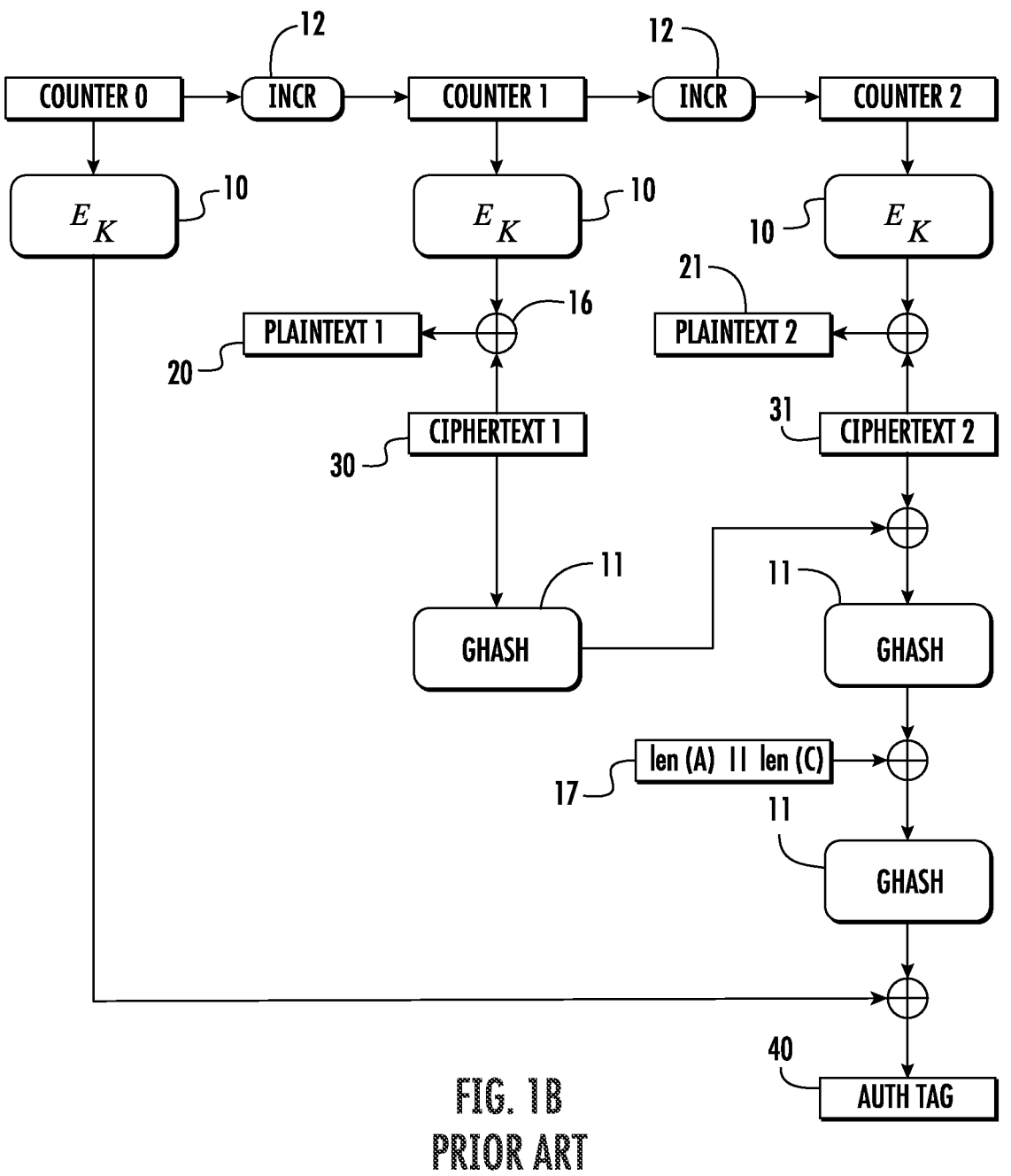
Figure 2:
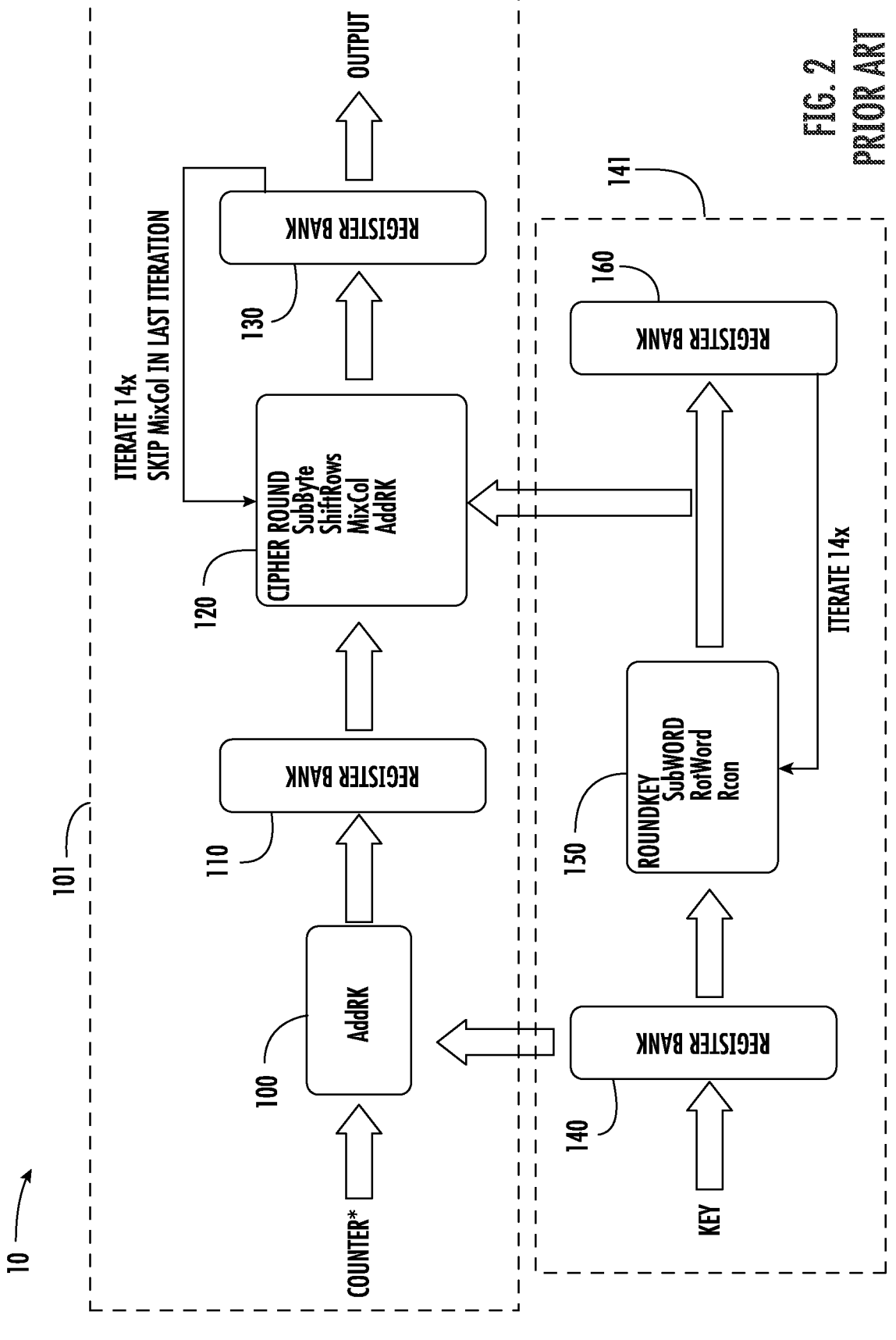
FIG. 2 shows one embodiment of the cipher function.
Figure 3:
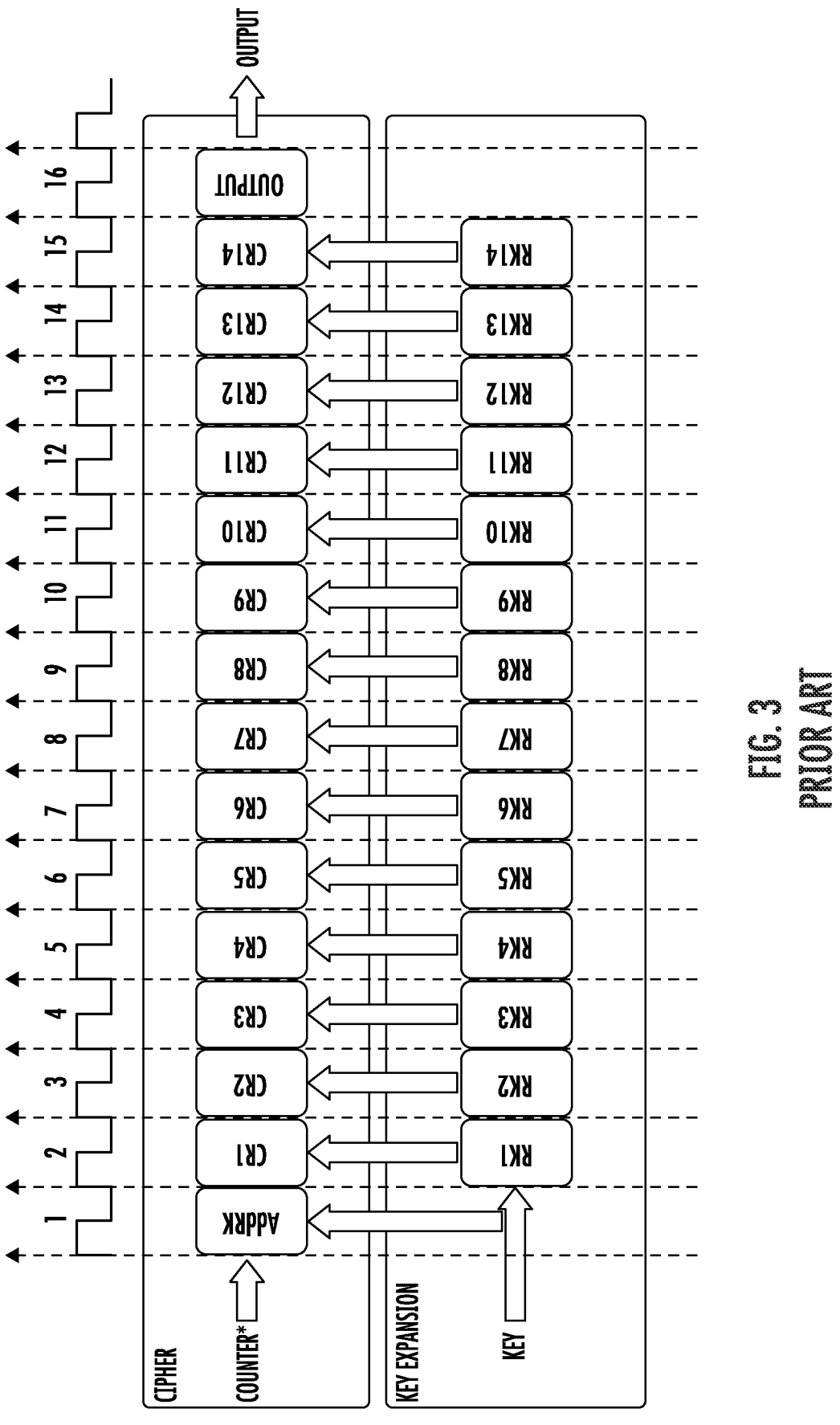
FIG. 3 shows a representative timing diagram showing the operation of the cipher function.
Figure 4:
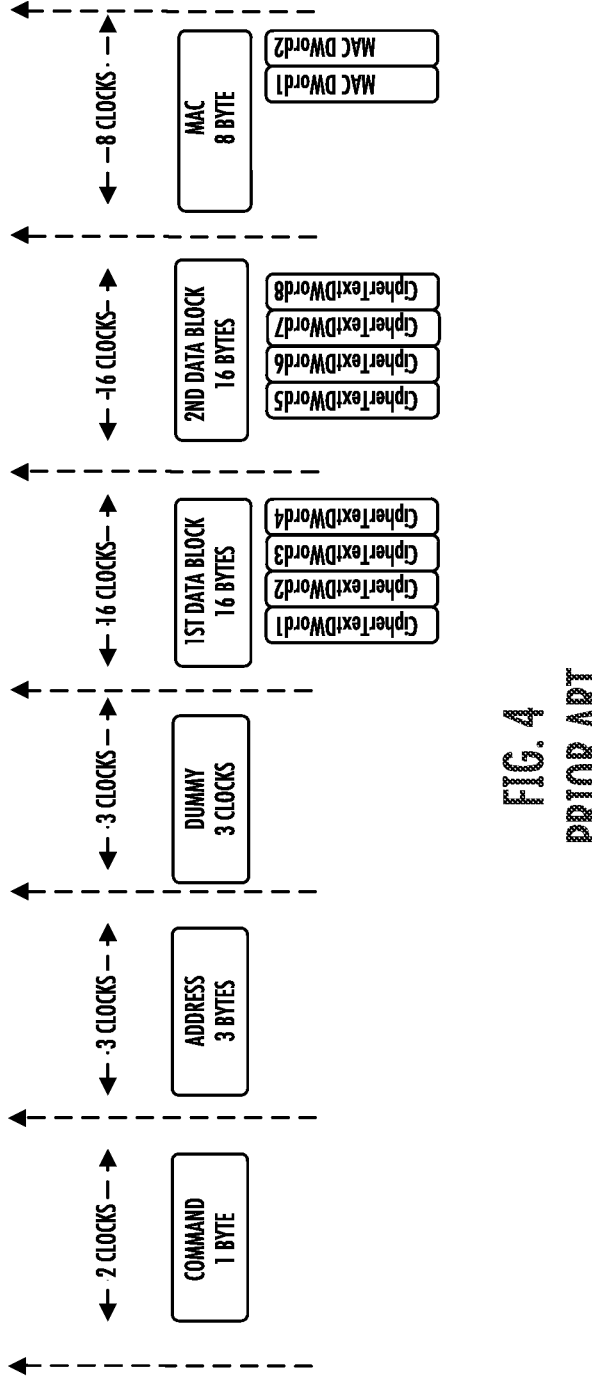
FIG. 4 shows a timing diagram of Quad SPI.

However, the complete duplication of the cipher function 10 (which is shown in FIGS. 2 and 3) is very expensive in term of semiconductor circuitry area. Therefore, it would be beneficial if it was possible to perform two cipher operations without duplicating all of the circuitry. In reviewing FIG. 2, it can be seen that the cipher function 10 has two components, a key expansion circuit 141 and a cipher generation circuit 101. Note that the key expansion circuit 141 is common each time the cipher function 10 is used. Thus, in one embodiment, the cipher generation circuit 101 is duplicated or triplicated while only one key expansion circuit 141 is used.

Figure 8:
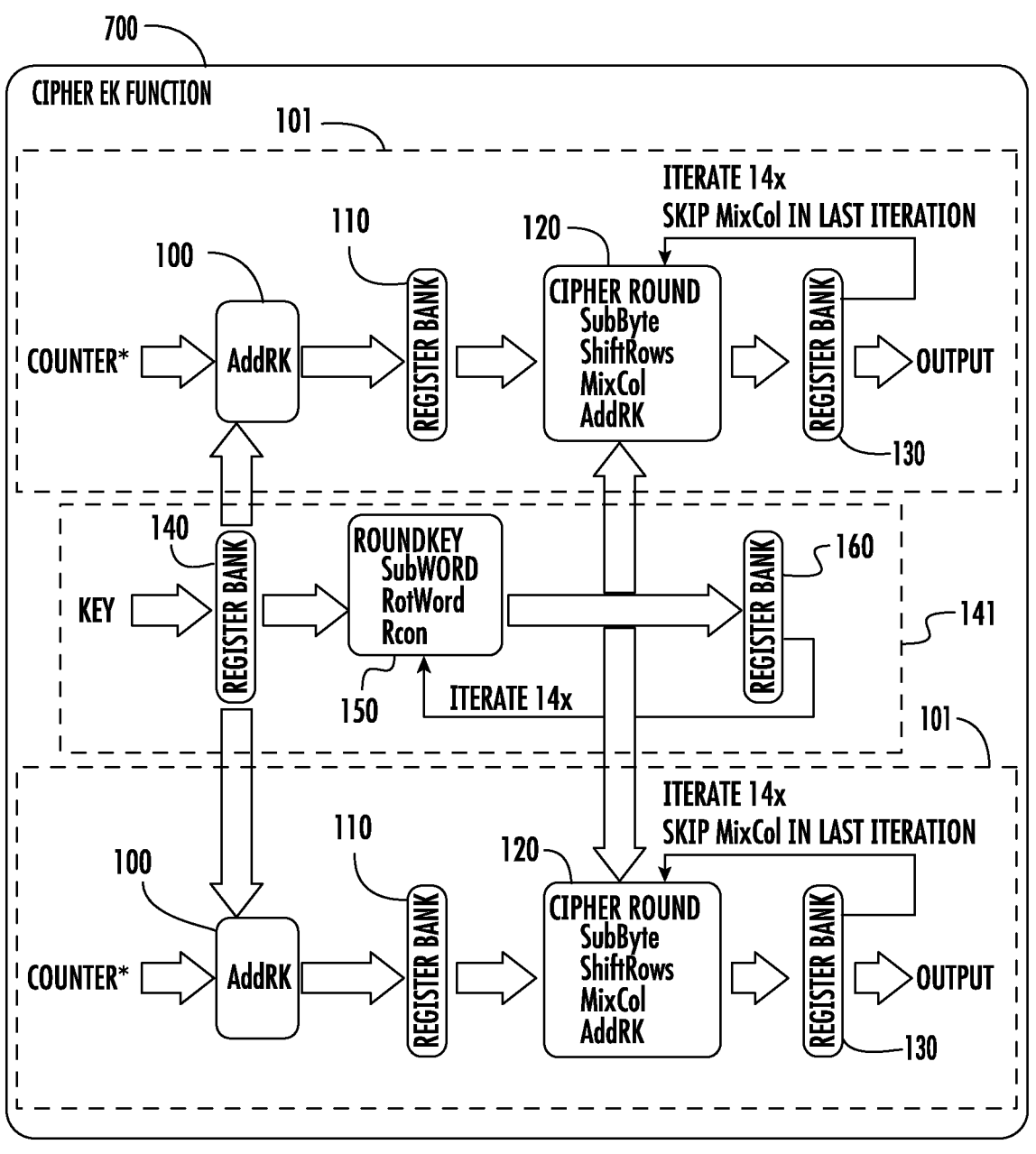
FIG. 8 shows a multiple cipher function that may be used in another modification of the AES engine.
Figure 9:
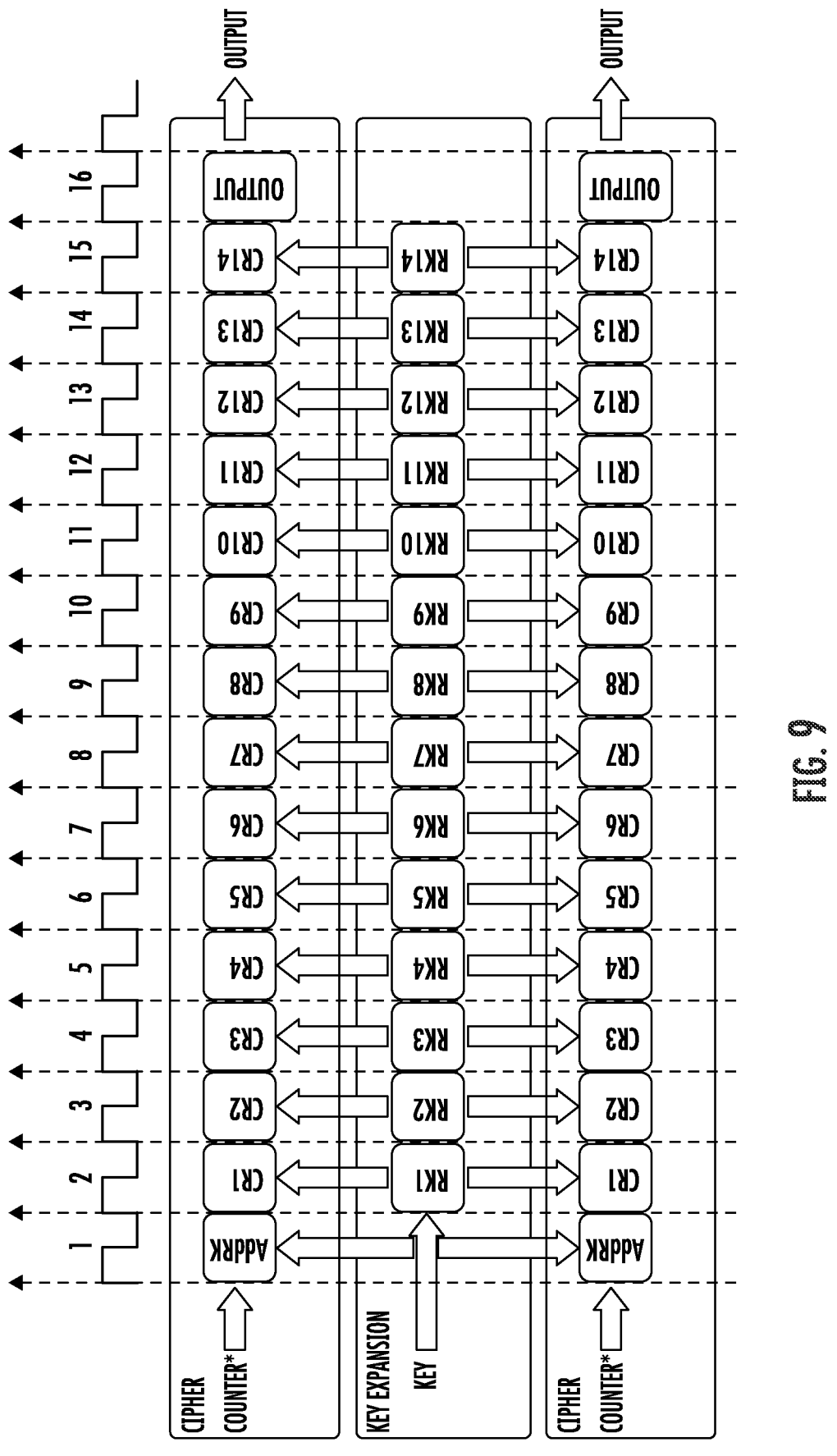
FIG. 9 shows a representative timing diagram showing the operation of the multiple cipher function.

FIG. 8 shows this modification. The multiple cipher function 700 comprises exactly one key expansion circuit 141, similar to that shown in FIG. 2. The output from that key expansion circuit 141 is used as an input to two or more cipher generation circuits 101. FIG. 8 shows two cipher generation circuits 101, however, three cipher generation circuits 101 may be included if desired. Thus, in this way, two or more counter values may be encrypted simultaneously although only one key expansion circuit 141 is utilized. FIG. 9 shows a timing diagram showing the operation of the multiple cipher function 700. Note that in 16 clock cycles, two counter values have been encrypted.

Figure 10:
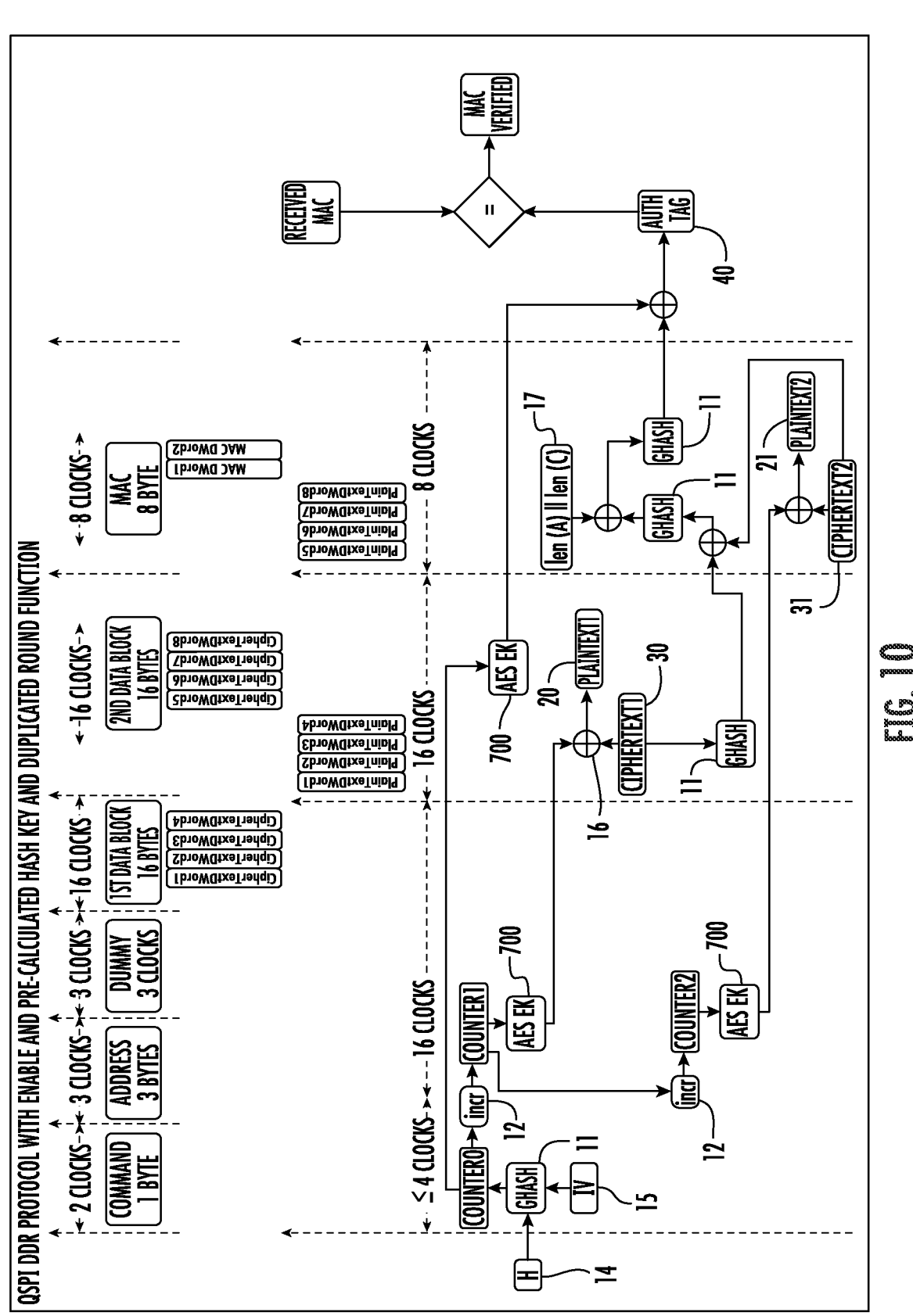
FIG. 10 shows the AES engine with the multiple cipher function along with a timing diagram of Quad SPI.

This multiple cipher function 700, which has exactly one key expansion circuit 141 and two or more cipher generation circuits 101, may be used in the AES engine 520, as shown in FIG. 10. In this embodiment the encrypted values of Counter 1 and Counter 2 may be computed at the same time. In this way, the plaintext data 20, 21 are available as soon as the encrypted data 30, 31 is read from the external memory device 550. Furthermore, because two counter values were encrypted simultaneously, the multiple cipher function 700 is available earlier to start encrypting the third counter value. Thus, in this embodiment, all three counter values are encrypted by the time that the second block of encrypted data 31 is available from the external memory device 550. Thus, in this configuration, once the second block of encrypted data 31 is available, only two GHASH functions 11 are necessary to generate the authentication tag 40. As noted above, the GHASH function 11 may be designed to consume 1, 2, 4 or 8 clock cycles. In this configuration, the GHASH function 11 is designed to consume 4 or less clock cycles so that the authentication tag 40 is available when the MAC is read from the external memory device 550.

In summary, exactly one multiple cipher function 700 is used, which has exactly one key expansion circuit 141 and two or more cipher generation circuits 101. The multiple cipher function 700 is used two times in series to perform the encryption of the three counter values, wherein at least two counters are encrypted at the same time. The encryption of all three counters is complete by the time that the second block of encrypted data 31 is read from the external memory device 550. Further, exactly one GHASH function 11 is used 4 times (once to create the Counter 0 value and three times to generate the authentication tag 40). Thus, in this embodiment, Hash subkey 14 is precalculated and stored. Additionally, the encryption that results in the value of Counter 0 is started as soon as a valid address is available. These modifications allow the plaintext data to be available and authenticated 48 clock cycles after the read operation begins. This is an improvement of 48 clock cycles over the embodiment shown in FIG. 5 and an improvement of up to 8 clock cycles over the embodiment shown in FIG. 7.

Based on this, it can be seen that if the value of Hash subkey 14 is precalculated, the AES engine 520 begins operation as soon as a valid memory address is available, and the three counter values can all be encrypted by the time that the MAC is read from the external memory device 550, no latency is incurred by the AES engine 520. FIG. 8-10 show one embodiment that allows the three counter values to be encrypted by the time that the MAC is read from the external memory device 550. However, there are other embodiments as well.

Figure 11:
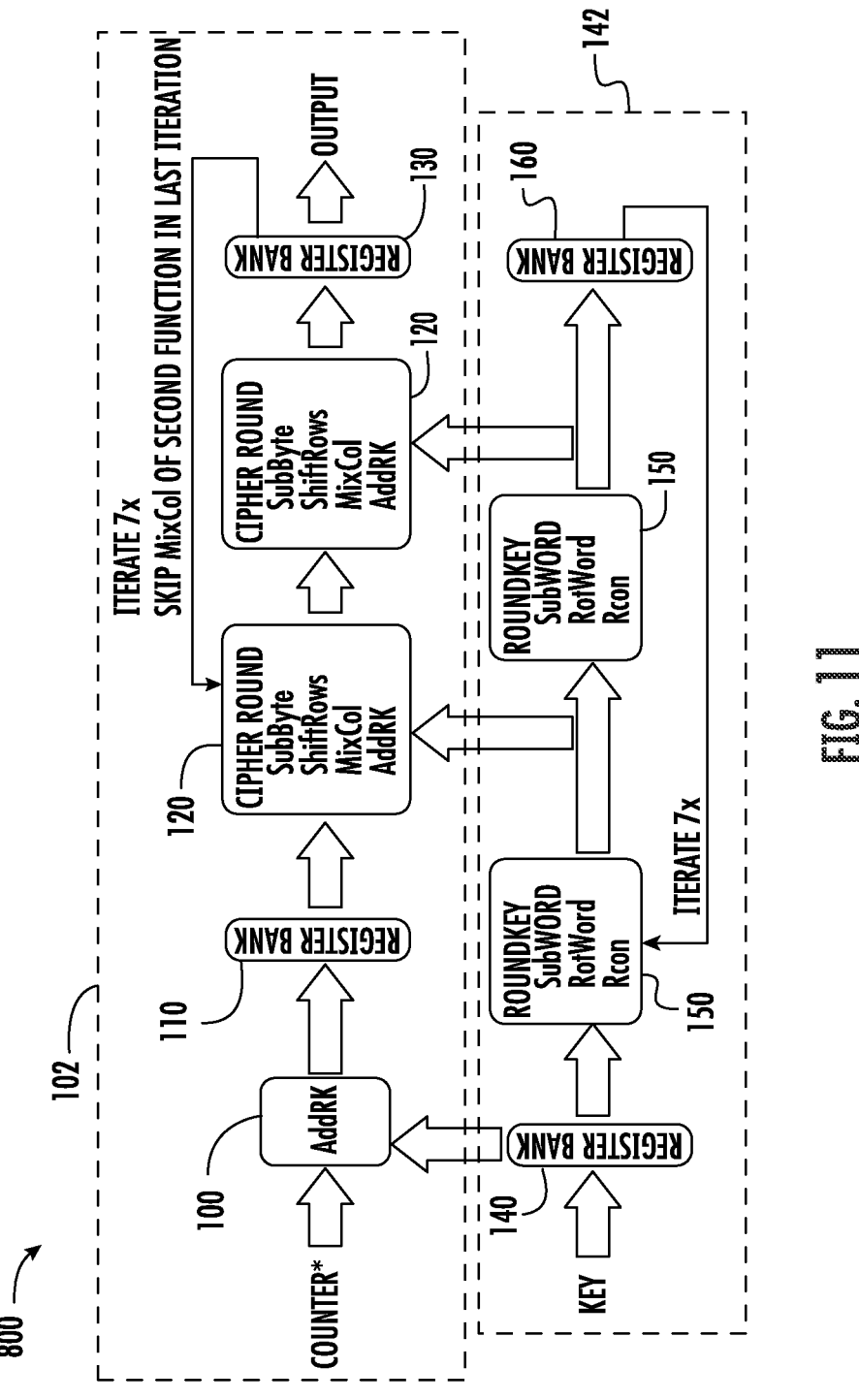
FIG. 11 shows one embodiment of the unrolled cipher function.

In another embodiment, the cipher function may be redesigned to consume fewer clock cycles. FIG. 11 shows one such redesign. In this embodiment, the unrolled cipher function 800 is redesigned to execute two rounds of the cipher during each clock cycle. The function 800 comprises an unrolled cipher unrolled cipher generation circuit 102 and an unrolled key expansion circuit 142, which are similar to those shown in FIG. 2. However, in this embodiment, there are two cipher round circuits 120 in series between the register banks 110, 130. In this way, two rounds are performed during each clock cycle. Similarly, there are two key round circuits 150 in series between key register banks 140, 160.

Figure 12:
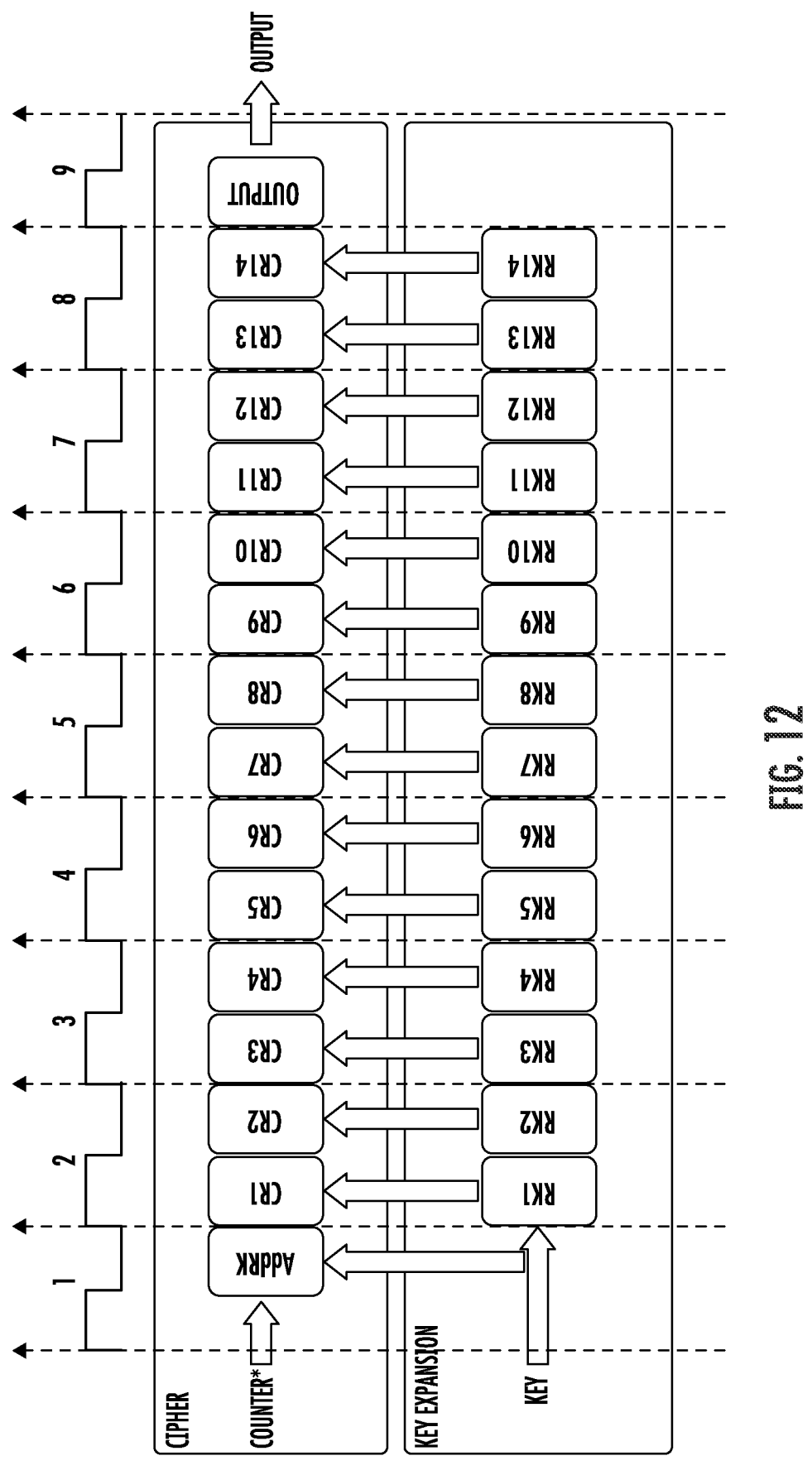
FIG. 12 shows a representative timing diagram showing the operation of the unrolled cipher function.

FIG. 12 shows the operation of this unrolled cipher function 800. Note that the counter value is encrypted in 9 clock cycles in this embodiment. Thus, the three counter values can all be serially encrypted within 27 clock cycles, which is less than the number of clocks needed to read the encrypted data 30, 31 and the MAC. Thus, this configuration is able to generate plaintext data and authenticated that data immediately after the MAC is read from the external memory device 550.

Figure 13:
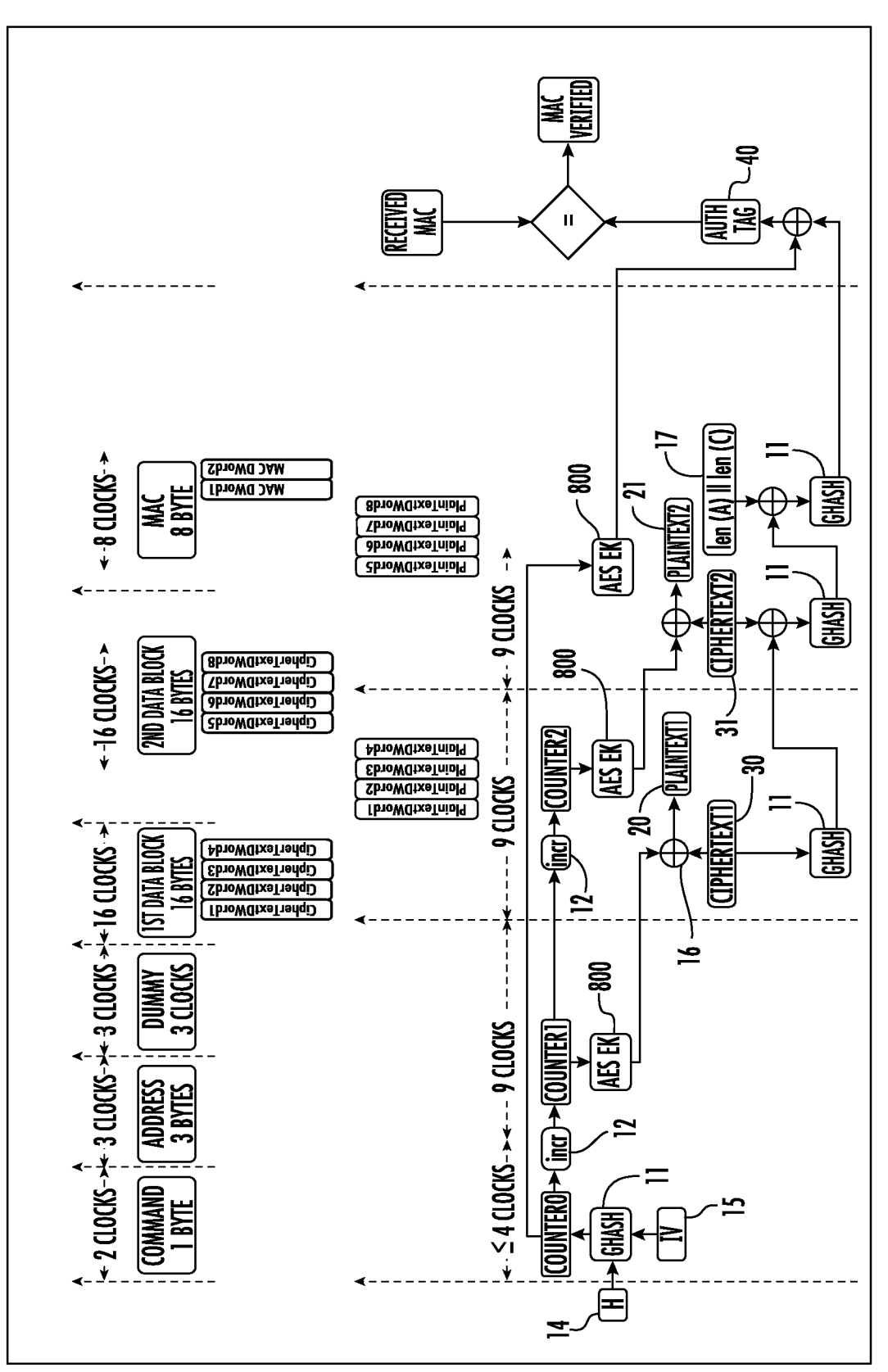
FIG. 13 shows the AES engine with the unrolled cipher function along with a timing diagram of Quad SPI.

This unrolled cipher function 800 may be used in the AES engine 520, as shown in FIG. 13. In this embodiment, the encrypted values of Counter 1 and Counter 2 may be computed sequentially. However, since the unrolled cipher function 800 only consumes 9 clock cycles, the plaintext data 20, 21 are available as soon as the encrypted data 30, 31 is read from the external memory device 550. Furthermore, because two counter values were encrypted in only 18 clock cycles, the unrolled cipher function 800 is available earlier to start encrypting the third counter value. Thus, in this embodiment, all three counter values are encrypted by the time that the MAC is available from the external memory device 550. Thus, in this configuration, once the second block of encrypted data 31 is available, only two GHASH functions 11 are necessary to generate the authentication tag 40. As noted above, the GHASH function 11 may be designed to consume 1, 2, 4 or 8 clock cycles. In this configuration, the GHASH function 11 is designed to consume 4 or less clock cycles so that the authentication tag 40 is available when the MAC is read from the external memory device 550.

Thus, in many of these embodiments, the encryption of the three counter values is performed in 32 clock cycles or less.

While the above description was disclosed with regard to Quad DDR SPI, the techniques described herein may also apply to Octal DDR SPI. In Octal DDR SPI, 16 bits of encrypted data are available every clock cycle. Therefore, 20 clock cycles would be required to read 32 bytes of encrypted data and 8 bytes of MAC (not including the transmission of the command, address and dummy cycles). Thus, to utilize execute-in-place, the AES engine 520 must be able to encrypt the three counter values in 20 clock cycles or less. One approach is to utilize the configuration of the multiple cipher function 700, shown in FIGS. 8-10, using three cipher generation circuits 101. In this way, the three counter values are encrypted within 16 clock cycles, less than required from execute-in-place operation using Octal DDR SPI.

Figure 14:
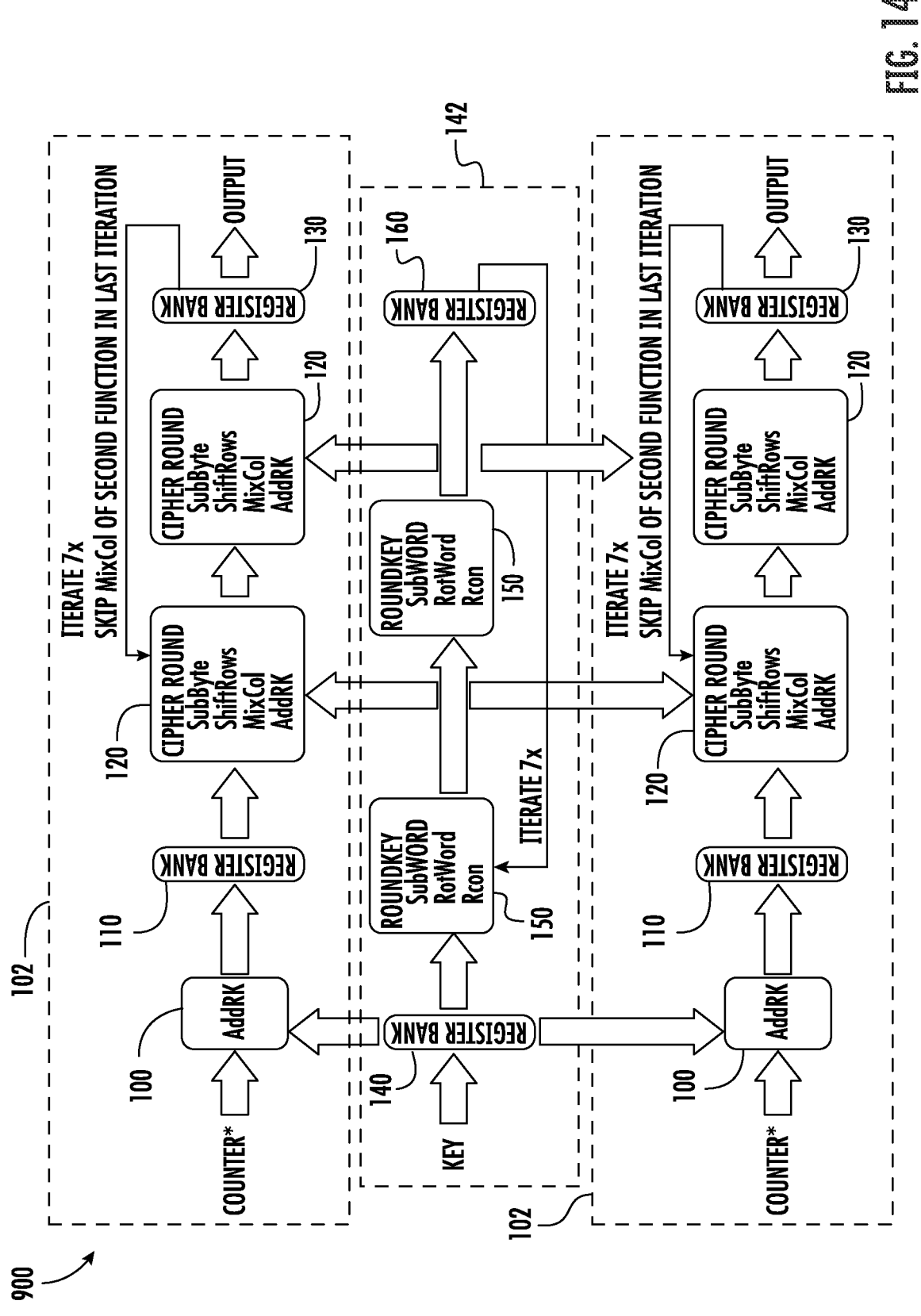
FIG. 14 shows a modified cipher function according to another embodiment.

Alternatively, as shown in FIG. 14, the unrolled cipher function 800 may be combined with the multiple cipher function 700 so that the modified cipher function 900 has exactly one unrolled key expansion circuit 142 and two unrolled cipher generation circuits 102. In this way, two counter values are encrypted within 9 clock cycles and the third counter value is encrypted 9 clock cycles later, which is still before the MAC is available.

Figure 15:
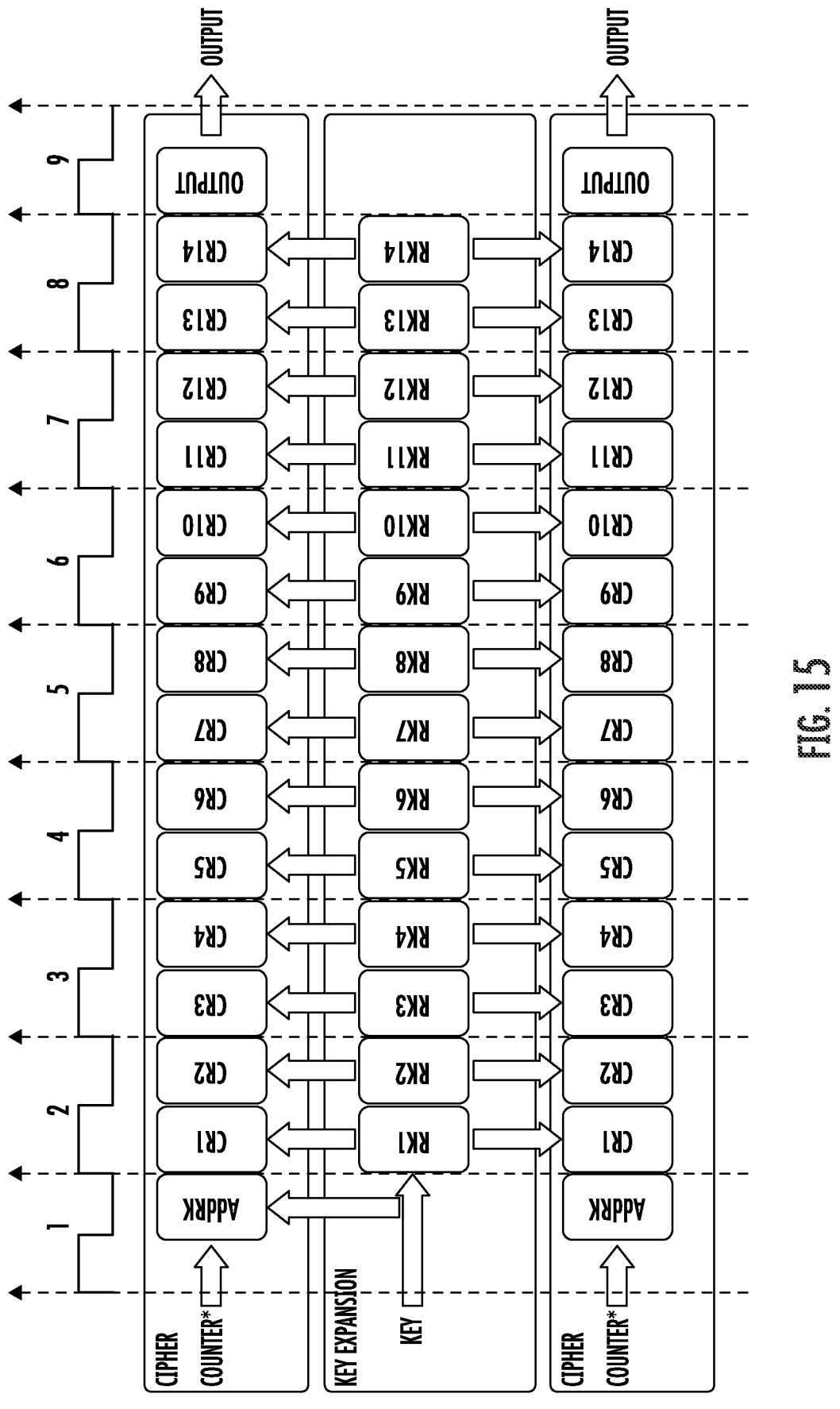
FIG. 15 shows a representative timing diagram showing the operation of the modified cipher function.
Figure 16:
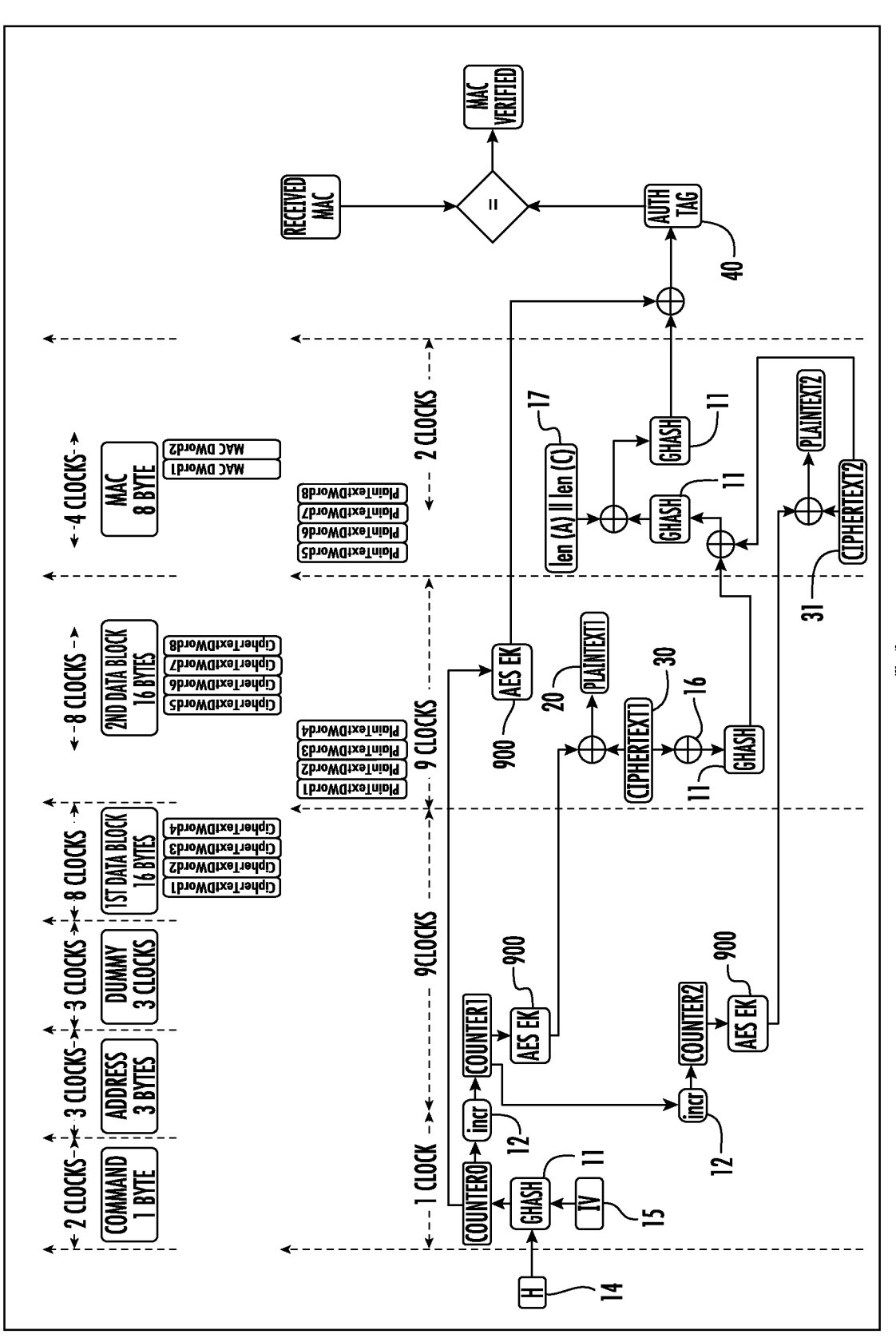
FIG. 16 shows the AES engine with the modified cipher function along with a timing diagram of Octal SPI.

An example timing diagram of this configuration is shown in FIG. 15. This modified cipher function 900 may be used in the AES engine 520, as shown in FIG. 16. In this embodiment, the encrypted values of Counter 1 and Counter 2 may be computed simultaneously. However, since the modified cipher function 900 only consumes 9 clock cycles, the plaintext data 20, 21 are available as soon as the encrypted data 30, 31 is read from the external memory device 550. Furthermore, because two counter values were encrypted in only 9 clock cycles, the modified cipher function 900 is available earlier to start encrypting the third counter value. Thus, in this embodiment, all three counter values are encrypted by the time that the MAC is available from the external memory device 550. Thus, in this configuration, once the second block of encrypted data 31 is available, only two GHASH functions 11 are necessary to generate the authentication tag 40. As noted above, the GHASH function 11 may be designed to consume 1 clock cycle so that the authentication tag 40 is available when the MAC is read from the external memory device 550.

The present system and method have many advantages. The present system allows execute-in-place capability without the need to completely duplicate circuitry in the SoC. Specifically, in one embodiment, no extra circuitry is added; only the one register to save the encrypted Hash subkey value. In another embodiment, only portions of the cipher function are duplicated. In this way, the increase in semiconductor area is less than would otherwise be required. In another embodiment, the cipher round circuit is duplicated so that two rounds can be performed each clock cycle. This increase in semiconductor area is much less than would be required if the entire cipher function was duplicated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A wireless network device, comprising:
a network interface;
a processing unit;
an Advanced Encryption Standard (AES) engine, utilizing Advanced Encryption Standard-Galois/Counter Mode (AES-GCM), adapted to interface with an external memory device, utilizing a Serial Peripheral Interface (SPI) interface and comprising:
exactly one Galois Hash (GHASH) function, wherein an encrypted Hash subkey value is precalculated and stored in a register and is used during each transaction, in combination with a memory address, to generate a value for Counter 0;
exactly one cipher function, wherein the exactly one cipher function comprises exactly one key expansion circuit and one or more cipher generation circuits;
wherein the AES engine is configured to:
use the GHASH function to generate a Counter 0 value using the encrypted Hash subkey value, wherein the GHASH function begins execution when a valid memory address is available;
increment the Counter 0 value to generate a Counter 1 value and a Counter 2 value;
use the exactly one cipher function to encrypt the Counter 0 value, the Counter 1 value and the Counter 2 value to generate an encrypted Counter 0 value, an encrypted Counter 1 value and an encrypted Counter 2 value;
receive encrypted code from the external memory device as eight doublewords and a Message authentication code (MAC) having two doublewords;
decrypt the eight doublewords by XORing the encrypted Counter 1 value and the encrypted Counter 2 value with the encrypted data to obtain plaintext data;
perform the GHASH function on the encrypted data and XOR with the encrypted Counter 0 value to generate an authentication tag; and
authenticate the MAC within eight clock cycles after receiving the MAC by comparing it with the authentication tag, so as to allow execute-in-place.

2. The wireless network device of claim 1, wherein the SPI interface comprises a Quad double data rate (DDR) SPI.

3. The wireless network device of claim 1, wherein the SPI interface comprises an Octal double data rate (DDR) SPI.

4. The wireless network device of claim 1, wherein the exactly one GHASH function consumes 8 clock cycles or less, such that the value of Counter 0 is available within 8 clock cycles after the memory address is valid.

5. The wireless network device of claim 1, wherein the exactly one cipher function comprises two or more cipher generation circuits, each receiving inputs from the exactly one key expansion circuit.

6. The wireless network device of claim 1, wherein the exactly one cipher function comprises exactly one unrolled cipher function, wherein the exactly one key expansion circuit is unrolled and the one or more cipher generation circuits comprise exactly one unrolled cipher generation circuit, where two rounds of key expansion and cipher generation are performed during each clock cycle.

7. The wireless network device of claim 1, wherein encryption of the Counter 0 value, the Counter 1 value and the Counter 2 value is performed by a time when the MAC is available from the external memory device.

8. A method of decrypting encrypted data and authenticating a message authentication code (MAC) read from an external memory device, wherein the encrypted data comprises 8 doublewords and the MAC comprises 2 doublewords, comprising:

calculating a hash subkey prior to reading the encrypted data from the external memory device;

using a Galois Hash (GHASH) function to generate a Counter 0 value using the hash subkey, wherein the GHASH function begins execution when a valid memory address is available;

incrementing the Counter 0 value to generate a Counter 1 value and a Counter 2 value;

using exactly one cipher function to encrypt the Counter 0 value, the Counter 1 value and the Counter 2 value to generate an encrypted Counter 0 value, an encrypted Counter 1 value and an encrypted Counter 2 value, wherein the exactly one cipher function comprises a circuit that includes exactly one key expansion circuit and one or more cipher generation circuits and the same circuit is used to encrypt the Counter 0 value, the Counter 1 value and the Counter 2 value;

decrypting the encrypted data by XORing the encrypted Counter 1 value and the encrypted Counter 2 value with the encrypted data to obtain plaintext data;

performing the GHASH function on the encrypted data and XORing with the encrypted Counter 0 value to generate an authentication tag; and comparing the authentication tag with the MAC to authenticate the MAC, wherein the authentication is performed within eight clock cycles after receiving the MAC, so as to allow execute-in-place.

9. The method of claim 8, wherein the exactly one cipher function comprises two cipher generation circuits, each in communication with the exactly one key expansion circuit, such that two encrypted counter values are generated simultaneously and encryption of a third counter value is performed sequentially.

10. The method of claim 8, wherein the exactly one cipher function comprises three cipher generation circuits, each in communication with the exactly one key expansion circuit, such that all three encrypted counter values are generated simultaneously.

11. The method of claim 8, wherein the exactly one key expansion circuit is unrolled and the one or more cipher generation circuits comprise exactly one unrolled cipher generation circuit in communication with the unrolled key expansion circuit, such that two or more rounds of key expansion and cipher generation are performed in one clock cycle, and wherein encryption of counter values is performed sequentially.

12. The method of claim 8, wherein the exactly one key expansion circuit is unrolled and the one or more cipher generation circuits comprise two or more unrolled cipher generation circuits in communication with the unrolled key expansion circuit, such that two or more rounds of key expansion and cipher generation are performed in one clock cycle, such that two or more encrypted counter values are generated simultaneously.

13. The method of claim 8, wherein encryption of the Counter 0 value, the Counter 1 value and the Counter 2 value is performed within 32 clock cycles.

* * * * *